(12) United States Patent
Eckert

(10) Patent No.: US 8,437,421 B2
(45) Date of Patent: May 7, 2013

(54) METHOD AND ARRANGEMENT FOR SOFT-DECISION SPHERE DECODING

(75) Inventor: Sebastian Eckert, Burgstädt OT Mohsdorf (DE)

(73) Assignee: Intel Mobile Communications Technology Dresden GmbH, Dresden (DE)

( * ) Notice: Subject to any disclaimer, the term of this patent is extended or adjusted under 35 U.S.C. 154(b) by 19 days.

(21) Appl. No.: 13/278,234

(22) Filed: Oct. 21, 2011

(65) Prior Publication Data

US 2012/0106684 A1  May 3, 2012

(30) Foreign Application Priority Data

Oct. 29, 2010 (EP) .................................... 10189471

(51) Int. Cl.
*H04B 7/02* (2006.01)
(52) U.S. Cl.
USPC ............ 375/267; 375/340; 375/341; 375/260
(58) Field of Classification Search .................. 375/267, 375/340, 341, 260
See application file for complete search history.

(56) References Cited

U.S. PATENT DOCUMENTS

| 7,187,728 | B2* | 3/2007 | Seier et al. ..................... 375/341 |
| 7,688,902 | B1* | 3/2010 | Lou et al. ...................... 375/260 |
| 2008/0279298 | A1 | 11/2008 | Ben-Yishai et al. |
| 2009/0232232 | A1* | 9/2009 | Duvaut et al. ................. 375/260 |
| 2010/0008441 | A1 | 1/2010 | Murakami et al. |
| 2010/0054372 | A1* | 3/2010 | Eckert ........................... 375/340 |
| 2011/0051861 | A1* | 3/2011 | Yang ............................. 375/341 |

OTHER PUBLICATIONS

European Search Report for 11185776.9-1237, dated Dec. 19, 2011.

* cited by examiner

*Primary Examiner* — Eva Puente
(74) *Attorney, Agent, or Firm* — SpryIP, LLC

(57) ABSTRACT

A method is provided for soft-decision sphere decoding for softbit computation which can be applied to all sphere decoding algorithms, in particular sphere decoding algorithms in any MIMO OFDM receiver implementations. Complexity reduction is achieved by using an approximate of linear Euclidean distances during the sphere decoding search. The method can be used in conjunction with MIMO OFDM communication systems like LTE, WiMax and WLAN.

4 Claims, 2 Drawing Sheets

METHOD AND ARRANGEMENT FOR SOFT-DECISION SPHERE DECODING

CROSS REFERENCE TO RELATED APPLICATIONS

This application claims priority of European application No. 10189471.5 filed on Oct. 29, 2010, the entire contents of which is hereby incorporated by reference herein.

FIELD OF THE INVENTION

The invention relates to a method and an arrangement for soft-decision sphere decoding.

BACKGROUND OF THE INVENTION

The system model of MIMO OFDM systems using $N_T$ transmit and $N_R$ receive antennas can be described in the frequency domain for every OFDM subcarrier individually by the received signal vector $y=[y_1, \ldots, y_{N_R}]^T$, the $N_R \times N_T$ channel matrix H, the transmitted symbol $x=[x_1, \ldots, x_{N_T}]^T$, and a disturbance vector $n=[n_1, \ldots, n_{N_R}]^T$ which represents the thermal noise on the receive antennas. The following equation then describes the transmission model:

$$y = H \cdot x + n \qquad (1)$$

The elements of the transmitted symbol vector x are complex valued QAM symbols taken from a QAM modulation e.g. 4-QAM, 16-QAM, or 64-QAM. Depending on the modulation alphabet, every QAM symbol is associated to a number of transmitted bits $N_{Bit}$, with $$N_{Bit} = \begin{cases} 2 & \text{for } 4-QAM \\ 4 & \text{for } 16-QAM \\ 6 & \text{for } 64-QAM \end{cases}$$

The elements of the channel matrix $h_{i,j}$ are also complex valued. They are estimated by the receiver.

At a certain stage of the signal processing chain the receiver computes softbits for every transmitted bit associated to the transmitted symbol vector x. Several methods are known for this purpose, with different error probabilities and different computational complexities. One near-optimal approach in terms of error probability is soft-decision sphere decoding.

A soft-decision sphere decoder takes the received signal vector y and the channel matrix H as input and outputs a softbit (i.e. a likelihood value) for every bit associated to x. When denoting the bits associated to $x_j$ (the QAM symbols of the j-th transmit antenna) by $[b_{j,1}, \ldots, b_{j,n}, \ldots, b_{j,Nbit(j)}]$, a softbit $p_{j,n}$ is defined by the following Euclidean distances:

$$d_{0,j,n}^2 = \min_{x_{0,j,n}} \{\|y - H \cdot x_{0,j,n}\|^2\}$$

$$d_{1,j,n}^2 = \min_{x_{1,j,n}} \{\|y - H \cdot x_{1,j,n}\|^2\} \qquad (2)$$

wherein $d_{0,j,n}^2$ and $d_{1,j,n}^2$ are the minimum Euclidean distances between the received signal vector y and all possible combinations of transmit symbols x, with the restriction that $x_{0,j,n}$ represents all those combinations of x for which the n-th bit of the j-th transmit antenna is zero. On the other hand, $x_{1,j,n}$ represents all those combinations of x for which the n-th bit of the j-th transmit antenna is one. The softbit for the n-th bit of the j-th transmit antenna is given by $$\rho_{j,n} = d_0^2 - d_1^2 \qquad (3).$$

A straight-forward algorithm would have to consider all combinations of x in the above equations in order to compute the softbits for one OFDM subcarrier. Since this approach is computationally very intensive and implies an exponential complexity, soft-decision sphere decoding algorithms have been proposed as a way to simplify the search. The simplification is achieved by QR decomposition of the channel matrix H followed by a tree search.

QR decomposition decomposes the channel matrix H into a orthogonal rotation matrix Q and an upper triangular matrix R, such that $H = Q \cdot R$. Since rotation by Q does not influence the Euclidean distances in the above equations, one can simplify the Euclidean distances $d_{0,j,n}^2$ and $d_{1,j,n}^2$ by $$d_{0,j,n}^2 = \min_{x_{0,j,n}} \{\|y' - R \cdot x_{0,j,n}\|^2\} \qquad (4)$$

$$d_{1,j,n}^2 = \min_{x_{1,j,n}} \{\|y' - R \cdot x_{1,j,n}\|^2\}$$

with $y' = Q^H \cdot y$.

A second step of the sphere decoding algorithm is the tree search.

The Euclidean distance from above, $d^2 = \|y' - R \cdot x\|^2$, can be separated into partial Euclidean distances $p_1^2, \ldots, p_{N_T}^2$ as follows:

$$d^2 = \left\| \begin{pmatrix} y'_1 \\ \ldots \\ y'_{N_T} \end{pmatrix} - \begin{pmatrix} r_{11} & \ldots & r_{1N_T} \\ 0 & \ldots & \ldots \\ 0 & 0 & r_{N_T N_T} \end{pmatrix} \begin{pmatrix} x_1 \\ \ldots \\ x_{N_T} \end{pmatrix} \right\|^2 = p_1^2 + \ldots + p_{N_T}^2, \qquad (5)$$

with $$p_{N_T}^2 = \|y'_{N_T} - r_{N_T N_T} \cdot x_{N_T}\|^2 \qquad (6)$$

$$p_1^2 = \|y'_1 - r_{11} \cdot x_1 - \ldots - r_{1N_T} \cdot x_{N_T}\|^2. \qquad (7)$$

The partial Euclidean distances separate the original Euclidean distance into $N_T$ portions. Due to the upper triangular structure of the R matrix, the partial Euclidean distances also separate the distance computation from the possibly transmitted QAM symbols $x_1, \ldots, x_{N_T}$, such that $p_{N_T}^2$ only depends on the QAM symbol $x_{N_T}$ and is not dependent on $x_1, \ldots, x_{N_T-1}$. Also, $p_{N_T-1}^2$ only depends on $x_{N_T}$ and $x_{N_T-1}$, and is not dependent on $x_1, \ldots, x_{N_T-2}$. This kind of dependency separation is utilized by the sphere decoding tree search in order to find the "closest" possible transmit symbol vector $x_{min}$.

The sphere decoding tree search assumes a maximum Euclidean distance $d_{max}^2$ which is definitely smaller than the Euclidean distance of the "closest" transmit symbol vector $x_{min}$. If now the search would start by choosing a candidate for $x_{N_T}$, the partial Euclidean distance $p_{N_T}^2$ is determined. In case of $p_{N_T}^2 > d_{max}^2$, all the Euclidean distances $d^2$ for all possible combinations of $x_1, \ldots, x_{N_T-1}$ (assuming the chosen $x_{N_T}$) will also exceed the maximum search radius $d_{max}^2$. Therefore, the search can skip computing the partial Euclidean distance $p_1^2, \ldots, p_{N_T-1}^2$, and can continue with another candidate for $x_{N_T}$.

This search procedure can be illustrated as a tree search as depicted in FIG. 1. The search tree consists of $N_T$ levels, that correspond to the QAM symbols of the different transmit antennas. In FIG. 1 $N_T = 3$ is assumed. Each tree node is associated to one possible QAM symbol $x_1, \ldots, x_{N_T}$. Therefore, the leave nodes of the tree represent all possible combinations of x.

In the example above, with $p_{N_T}^2 > d_{max}^2$, after choosing a candidate for $x_{N_T}$ the complete sub-tree below the chosen $x_{N_T}$ would be skipped during the sphere search.

For finding the "closest" transmit symbol vector x, the maximum Euclidean distance $d_{max}^2$ is initialized with ∞ (infinity). This means, that the partial Euclidean distances never exceed the limit, and that the sphere search reaches the bottom level after $N_T$ depth-first steps. The resulting Euclidean distance $d^2$ then provides an update of the maximum search distance $d_{max}^2$. The sphere search would now continue and try to update $d_{max}^2$ if the bottom level of the tree is reached and if the resulting Euclidean distance would shrink $d_{max}^2$.

The result of this search process is $d_{max}^2$ being the Euclidean distance according to the "closest" possible symbol vector $x_{min}$. If $x_{min}$ is restricted to certain bits being 0 or 1, the search tree can be adopted accordingly such that the search tree is built upon QAM symbols which meet the respective restrictions.

FIG. 2 illustrates an improvement of the sphere search by ordering the sibling nodes at a tree level k by increasing partial Euclidean distances $p_k^2$.

In a case where the maximum search distance $d_{max}^2$ is exceeded at a tree level k (solid tree node) and the partial Euclidean distances $p_k^2$ are not ordered, the search would continue with the next candidate node (the respective QAM symbol $x_k$) on the same level (arrow "A"). However, if the nodes in the tree are ordered by increasing $p_k^2$, the search can continue with the next node at level k−1 (arrow "B"). This is, permissible simply because due to the ordering of the sibling nodes the next candidate at the same level k would also exceed the maximum search distance $d_{max}^2$. In this case, the sub-tree which is skipped during the sphere search is much larger, and thus search complexity is much lower. It will be understood from the above that ordering of the sibling nodes by increasing partial Euclidean distances is essential for any efficient sphere decoding algorithm.

As mentioned above, Euclidean distances have to be computed during the sphere decoding algorithm which are given by the following equation:

$$d^2 = \|y' - R \cdot x\|^2 \quad (8)$$

These distances are used as a search metric in order to find the closest possible symbol vector $x_{min}$ and its associated Euclidean distance.

However, the computation of the Euclidean distances always requires multiplications for calculating the squared absolute value of a vector $z = [z_1, \ldots, z_{N_R}]$ having complex elements $z_r$.

$$z = y' - R \cdot x \quad (9)$$

$$d^2 = \|z_1\|^2 + \ldots + \|z_{N_R}\|^2 \quad (10)$$

For practical implementations multiplications always involve significant computational complexity. Furthermore, multiplications increase the bit-width requirements of the multiplication result.

An object of the invention therefore is to provide a sphere decoding search algorithm with reduced computational complexity.

SUMMARY OF THE INVENTION

According to the invention there is provided a method for soft-decision sphere decoding.

The inventive method is adapted for use in a MIMO OFDM receiver with two receive antennas and comprises the steps of: receiving a channel matrix H and a received signal vector y; decomposing the channel matrix H into an orthogonal rotation matrix Q and an upper triangular matrix R, such that $H = Q \cdot R$; performing a tree search based on Euclidean distances $d^2$ given by $d^2 = \|z\|^2$ to find a symbol vector $x_{min}$ having a best likelihood to correspond to a transmitted symbol x, with $z = y' - R \cdot x$ and $y' = Q^H \cdot y$. According to the invention, the tree search step comprises determining and using a linear approximation of the square-root of the Euclidean distances which is expressed as $$\tilde{d} = (16 \cdot a_1 + 5 \cdot (a_2 + a_3) + 4 \cdot a_4)/16,$$

wherein $a_1$, $a_2$, $a_3$, $a_4$ are absolute values of the real and imaginary parts of $z_1$ and $z_2$, ordered in descending order, such that $a_1 \geq \{a_2, a_3\} \geq a_4$, with $z_1$ and $z_2$ being the complex valued elements of the vector z.

The invention also provides an arrangement for soft-decision sphere decoding for use in an MIMO OFDM receiver. Advantageously, the arrangement according to the invention exhibits very low complexity; in particular it does not comprise any multipliers.

By using linear distances and in particular a linear approximation of the square-root Euclidean distances instead of squared Euclidean distances, the novel approach provides for significantly reduced computational complexity. The linear approximation of the square-root of Euclidean distances according to the invention is devised such that any multiplication operations can be dispensed with for computing d. Thus, the invention provides a way to significantly reduce computational complexity for practical implementations. A further advantage is the limited bit-width requirement on distance computation.

The invention can be used in conjunction with MIMO OFDM communication systems like LTE, WiMax, and WLAN.

BRIEF DESCRIPTION OF THE DRAWINGS

Additional features and advantages of the present invention will be apparent from the following detailed description of specific embodiments which is given by way of example only and in which reference will be made to the accompanying drawings, wherein.

DETAILED DESCRIPTION

Figure 1:
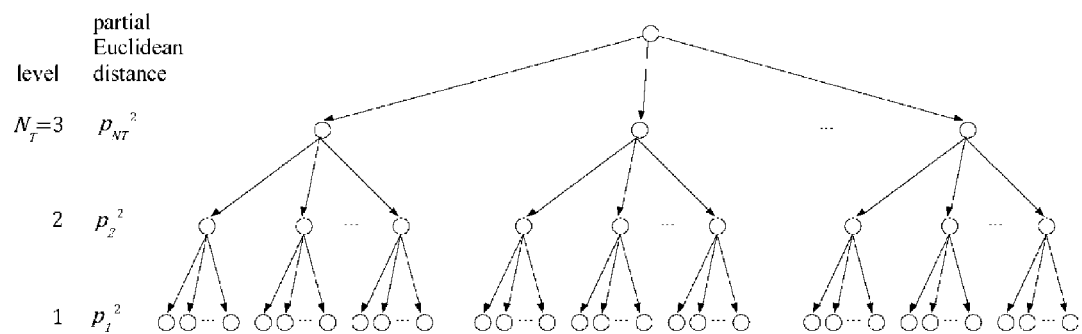
FIG. 1 illustrates a tree search scheme.
Figure 2:
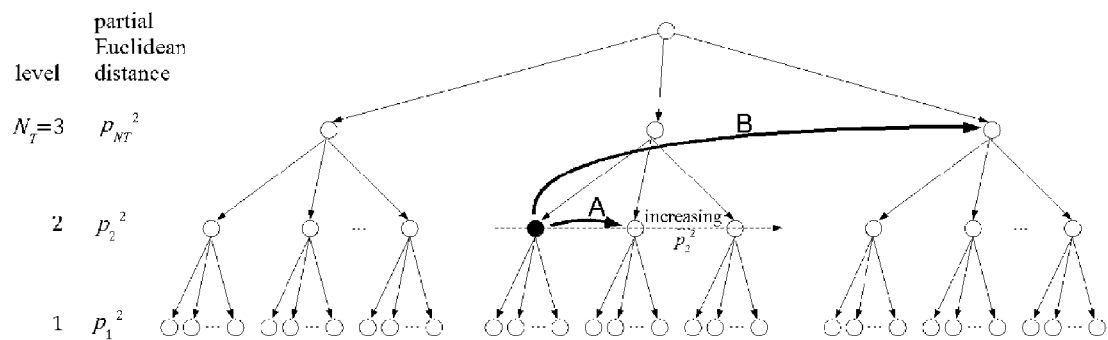
FIG. 2 illustrates an optimization of sphere search in the tree search of FIG. 1.

As stated before, the search metric for the sphere decoding search is based on the Euclidean distances $d^2$ given by $d^2 = \|y' - R \cdot x\|^2$.

Instead, the sphere decoding search algorithm according to the invention uses the square-root of the Euclidean distances d given by $$d = \sqrt{\|y' - R \cdot x\|^2} \quad (11).$$

In this case, the search for the closest possible symbol vectors $x_{min}$ will lead to the same result. However, the minimum search metric at the end of the search will be d instead of $d^2$.

For softbit computation for the n-th bit of the j-th transmit antenna still the given equation must be fulfilled:

$$\rho_{j,n} = d_{0,j,n}^2 - d_{1,j,n}^2 \quad (12).$$

When using square-root Euclidean distances d for the sphere decoding search, the multiplication would then be required for calculating $p_{j,n}$ instead upon calculating the search metric. However, the inventors have realized that in this case the overall complexity is still much lower than if Euclidean distances $d^2$ would be used during the sphere decoding search.

For the case of a MIMO OFDM system with 2 receive and 2 transmit antennas ($N_T=2$, $N_R=2$) the square-root Euclidean distance is given by $$d=\sqrt{\|z\|^2},\qquad(13)$$

which corresponds to $$d=\sqrt{\text{real}(z_1)^2+\text{imag}(z_1)^2+\text{real}(z_2)^2+\text{imag}(z_2)^2}\qquad(14).$$

It is known from literature, Paul S. Heckbert (editor), Graphics Gems IV' (IBM Version): IBM Version No. 4, Elsevier LTD, Oxford; Jun. 17, 1994), chapter 11.2, that such distance metric can be approximated by the following linear equation $$\tilde{d}=0.9262\cdot a_1+0.3836\cdot a_2+0.2943\cdot a_3+0.2482\cdot a_4\qquad(15),$$

wherein $a_1$, $a_2$, $a_3$, $a_4$ are the absolute values of the real and imaginary parts of $z_1$ and $z_2$, ordered in descending order, such that $a_1\geq a_2\geq a_3\geq a_4$. The coefficients for the approximation have been optimized to minimize the maximum relative error between d and $d^2$.

The method of soft-decision sphere decoding according to the invention uses a modification of the above linear approximation of expression (15). This modification has been devised by the inventor with regard to a very simple implementation thereof in hardware:

$$\tilde{d}=(16\cdot a_1+5\cdot(a_2+a_3)+4\cdot a_4)/16\qquad(16).$$

This linear metric can be implemented by simple shift operations and additions, rather than multiplications. Furthermore, for the disclosed metric (16), $a_2$ and $a_3$ do not have to be sorted necessarily, which eliminates one sorting operation. For calculating d with satisfying accuracy, a complete ordering such that $a_2\geq a_3$ is not required. So, the sorting follows $a_1\geq\{a_2, a_3\}\geq a_4$ only.

Figure 3:
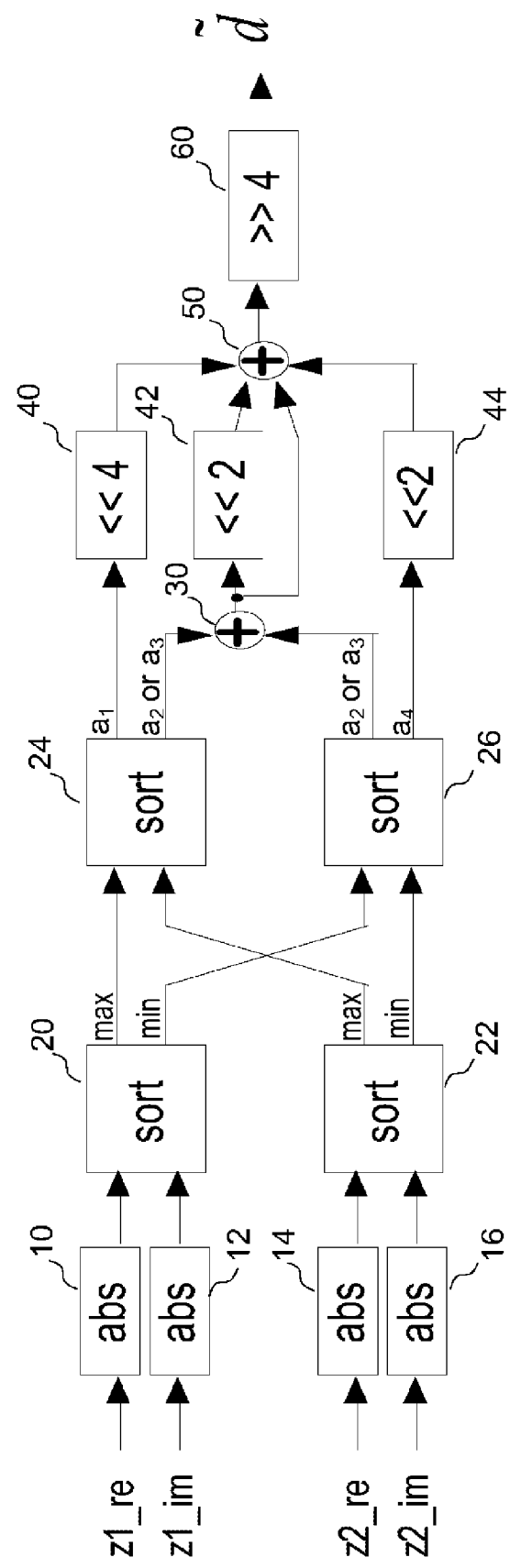
FIG. 3 shows a block diagram of an arrangement for computing the approximate square-root Euclidean distance according to the invention.

FIG. 3 shows a block diagram of an exemplary embodiment of an arrangement for determining the approximate square-root Euclidean distance $\tilde{d}$ according to the approximative expression (16) of the invention.

Since the approximation only involves multiplications by constants, no real multiplication is needed for calculating $\tilde{d}$.

In detail, the arrangement of FIG. 3 comprises an absolute-value generator 10 for determining the absolute value of the real part of $z_1$, an absolute-value generator 12 for determining the absolute value of the imaginary part of $z_1$ an absolute-value generator 14 for determining the absolute value of the real part of $z_2$, and an absolute-value generator 16 for determining the absolute value of the imaginary part of $z_2$.

The arrangement further comprises a comparator 20 connected to both of absolute-value generators 10 and 12 to determine a higher and a lower one of the two absolute values therefrom and to output them as a maximum and a minimum value, respectively. Similarly, a comparator 22 is connected to both of absolute-value generators 14 and 16 to determine and output a maximum and a minimum of the two absolute values therefrom.

A comparator 24 is connected to a first output of comparator 20 and to a first output of comparator 22 to receive the respective maximum absolute values therefrom. Comparator 24 compares the two maximum values and determines the higher one thereof as the highest of all four absolute values, i.e. $a_1$. A comparator 26 is connected to a second output of comparator 20 and to a second output of comparator 22 to receive the respective minimum absolute values therefrom. Comparator 26 compares the two minimum values and determines the lower one thereof as the lowest of all four absolute values, i.e. $a_4$.

As mentioned before, for the linear approximation according to the invention as set forth in expression (16), a sorting operation for $a_2$ and $a_3$ can be dispensed with. Rather, satisfying accuracy of soft-decision sphere decoding is obtained by sorting the four absolute values according to $a_1\geq\{a_2, a_3\}\geq a_4$ as performed by comparators 20, 22, 24, and 26. An adder 30 is connected to comparators 24 and 26 to receive therefrom the two intermediate absolute values to add them up to obtain a sum of $a_2$ and $a_3$.

The arrangement of FIG. 3 further comprises bit shifters 40, 42, 44, and 60. Left-shift operations by n bits are indicated by "<<n", and right-shift operations are indicated by ">>n". As can be seen in the figure, bit shifter 40 is connected to comparator 24 to receive $a_1$ to subject it to a left shift operation by 4 bits to effect a multiplication of $a_1$ by 16. Bit shifter 42 is connected to adder 30 to receive therefrom the sum of $a_2$ and $a_3$ to subject it to a left shift operation by 2 bits which effects a multiplication of the sum by 4. Bit shifter 44 is connected to comparator 26 to receive $a_4$ to subject it to a left shift operation by 2 bits to effect a multiplication of $a_4$ by 4.

An adder 50 is connected to adder 30 and to each of bit shifters 40, 42, and 44 to receive the outputs therefrom to add them all up, i.e. adder 50 sums $16\cdot a_1$ and $4\cdot(a_2+a_3)$, and $(a_2+a_3)$, and $4\cdot a_4$. Bit shifter 60 subjects the output of adder 50 to a right shift operation by 4 bits to implement a division of the sum from adder 50 by 16, and outputs the result as $\tilde{d}$, according to expression (16).

The disclosed method and arrangement for soft-decision sphere decoding using linear distances as described above provides a solution for further complexity reduction of all sphere decoding search algorithms. It can be shown by simulations that the introduced approximation to the square-root Euclidean distances is accurate enough for the overall soft-decision sphere decoding algorithm.

The invention claimed is:

1. A method for soft-decision sphere decoding for use in a MIMO OFDM receiver having two receive antennas, comprising the steps of:
   receiving a channel matrix H and a received signal vector y;
   decomposing the channel matrix H into an orthogonal rotation matrix Q and an upper triangular matrix R, such that $H=Q\cdot R$;
   performing a tree search based on Euclidean distances $d^2$ given by $d^2=\|z\|^2$ to find a symbol vector $x_{min}$ having a best likelihood to correspond to a transmitted symbol x, with $z=y'-R\cdot x$ and $y'=Q^H\cdot y$;
   wherein the tree search step comprises determining a linear approximation of the square-root of the Euclidean distances which is expressed as $$\tilde{d}=(16\cdot a_1+5\cdot(a_2+a_3)+4\cdot a_4)/16,$$

wherein $a_1$, $a_2$, $a_3$, $a_4$ are absolute values of real and imaginary parts of $z_1$ and $z_2$, ordered in descending order, such that $a_1\geq\{a_2, a_3\}\geq a_4$, with $z_1$ and $z_2$ being complex valued elements of the vector z.

2. The method of claim 1, wherein the step of determining a linear approximation of the square-root of the Euclidean distances comprises the sub-steps of:
   (a) determining absolute values of the real and imaginary parts of $z_1$ and of the real and imaginary parts of $z_2$;

(b) ordering said absolute values according to their magnitude to define $a_1, a_2, a_3, a_4$ such that $a_1 \geq \{a_2, a_3\} \geq a_4$;
(c) adding up $a_2$ and $a_3$ to obtain a sum $a_2+a_3$; and
(d) performing a left shift operation by 2 bits on said sum;
(e) performing a left shift operation by 4 bits on $a_1$;
(f) performing a left shift operation by 2 bits on $a_4$;
(g) adding up results of steps (c) to (f); and
(h) performing a right shift operation by 4 bits on result of step (g).

3. An arrangement for soft-decision sphere decoding for use in a MIMO OFDM receiver having two receive antennas, said arrangement being adapted for determining a linear approximation of the square-root of the Euclidean distances which is expressed as a $$\tilde{d} = (16 \cdot a_1 + 5 \cdot (a_2 + a_3) + 4 \cdot a_4)/16,$$

wherein $a_1, a_2, a_3, a_4$ are absolute values of real and imaginary parts of $z_1$ and $z_2$, ordered in descending order, such that $a_1 \geq \{a_2, a_3\} \geq a_4$, with $z_1$ and $z_2$ being complex valued elements of a vector z, with $z = y' - R \cdot x$ and $y' = Q^H \cdot y$, wherein H is a channel matrix, Q is an orthogonal rotation matrix, R is an upper triangular matrix such that $H = Q \cdot R$, x is a transmitted symbol, and y is a received signal vector, for performing a tree search to find a symbol vector $x_{min}$ having a best likelihood to correspond to a transmitted symbol, wherein the arrangement comprises:
a first absolute-value generator for determining absolute value of the real part of $z_1$;
a second absolute-value generator for determining absolute value of the imaginary part of $z_1$;
a third absolute-value generator for determining absolute value of the real part of $z_2$;
a fourth absolute-value generator for determining absolute value of the imaginary part of $z_2$;
means for ordering said first, second, third, and fourth absolute values according to their magnitude for defining $a_1, a_2, a_3, a_4$ such that $a_1 \geq \{a_2, a_3\} \geq a_4$;
a first adder connected to said ordering means to receive therefrom and add $a_2$ and $a_3$;
a first bit shifter connected to said ordering means to receive therefrom $a_1$ to subject $a_1$ to a left shift operation by 4 bits;
a second bit shifter connected to said first adder to receive therefrom sum of $a_2$ and $a_3$ to subject the sum to a left shift operation by 2 bits;
a third bit shifter connected to said ordering means to receive therefrom $a_4$ to subject $a_4$ to a left shift operation by 2 bits;
a second adder connected to said first adder and to each of said first, second, and third bit shifters to receive outputs therefrom to add up the outputs; and
a fourth bit shifter connected to said second adder to receive an output therefrom and subject the output to a right shift operation by 4 bits, and to output result as $\tilde{d}$.

4. The arrangement of claim 3, wherein the means for ordering the absolute values according to their magnitude for defining $a_1, a_2, a_3, a_4$ comprise:
a first comparator connected to the first and second absolute-value generators to determine and output a maximum and a minimum of said first and second absolute values;
a second comparator connected to the third and fourth absolute-value generators to determine and output a maximum and a minimum of said third and fourth absolute values;
a third comparator connected to a first output of the first comparator and to a first output of the second comparator to receive each of the maximum absolute values therefrom, to define the higher absolute value thereof as $a_1$ and to define the lower absolute value thereof as $a_2$ or $a_3$; and
a fourth comparator connected to a second output of the first comparator and to a second output of the second comparator to receive each of the minimum absolute values therefrom, to define the higher absolute value thereof as $a_2$ or $a_3$, and to define the lower absolute value thereof as $a_4$.

* * * * *